Figure 1:
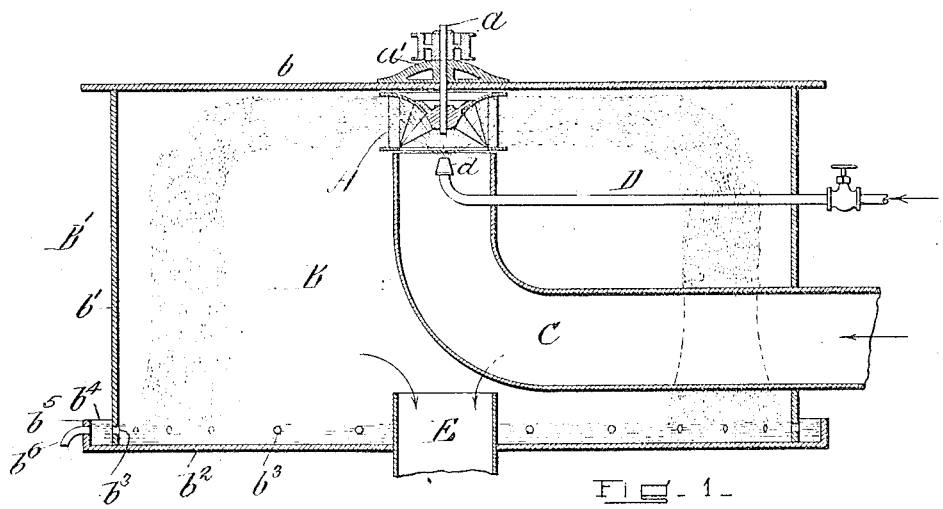

No. 883,090. PATENTED MAY 19, 1908.
P. KESTNER.
CENTRIFUGAL FAN OR MACHINE FOR ATOMIZING LIQUIDS.
APPLICATION FILED OCT. 10, 1906.

WITNESSES
Franklin P. Phillips Jr.
H. E. Flaherty.

INVENTOR
Paul Kestner
by his atty
Clarke Raymond & Crull

UNITED STATES PATENT OFFICE.

PAUL KESTNER, OF LILLE, FRANCE.

CENTRIFUGAL FAN OR MACHINE FOR ATOMIZING LIQUIDS.

No. 888,090.     Specification of Letters Patent.     Patented May 19, 1908.

Application filed October 10, 1906. Serial No. 338,225.

*To all whom it may concern:*

Be it known that I, PAUL KESTNER, a citizen of the French Republic, residing at Lille, in the Nord Province of France, have invented new and useful Improvements in Centrifugal Fans or Machines for Atomizing Liquids, of which the following is a specification.

This invention has reference to improvements relating to centrifugal fans or machines for atomizing liquids for carrying out processes such as the purification of water by oxidation by means of air, or the treatment of gases by bringing them into intimate contact with a liquid in a finely divided state.

I have found that, when water is atomized by being injected into a centrifugal fan or drum having a central intake and circumferential discharge and inclosed within the usual casing, a considerable part of the atomized liquid or mist is thrown by the fan or drum against the walls of the case and thereby re-converted into the form of liquid so that for example when the object of the atomization is to moisten the air within, say, a room or chamber or chambers, a considerably larger quantity of water has to be atomized to effect the required moistening than would be necessary if the whole of the mist originally produced were available.

The object of my invention is to obviate this defect; and in carrying out the invention I employ a chamber or casing which, at those parts where the liquid is thrown off by the fan or drum and where the atomized liquid in the form of extremely fine drops or mist flows to the outlet of the case, is of such a size internally that the mist produced will not be thrown against the casing but will gradually flow to the outlet of the case from whence it may be conducted in the usual manner to the place or places desired.

My experiments show that, as regards the purification of gases, the result attained by passing a gas once through my improved apparatus is more complete than if the gas were passed successively through several fans mounted in the ordinary snail-shell casings and each provided with water injection.

Quite a number of operations which could not be satisfactorily accomplished on a commercial scale heretofore—operations in which a liquid requires to be treated by being brought into intimate contact with a gas, or vice versa—are now possible by means of this apparatus. In particular, I may mention the purification of water by oxidation by means of atmospheric air; in consequence of the intimate and, above all, prolonged contact with the air passed through the fan, the oxidation of water submitted to atomization in my improved apparatus is completely effected in one passage therethrough.

Figure 2:
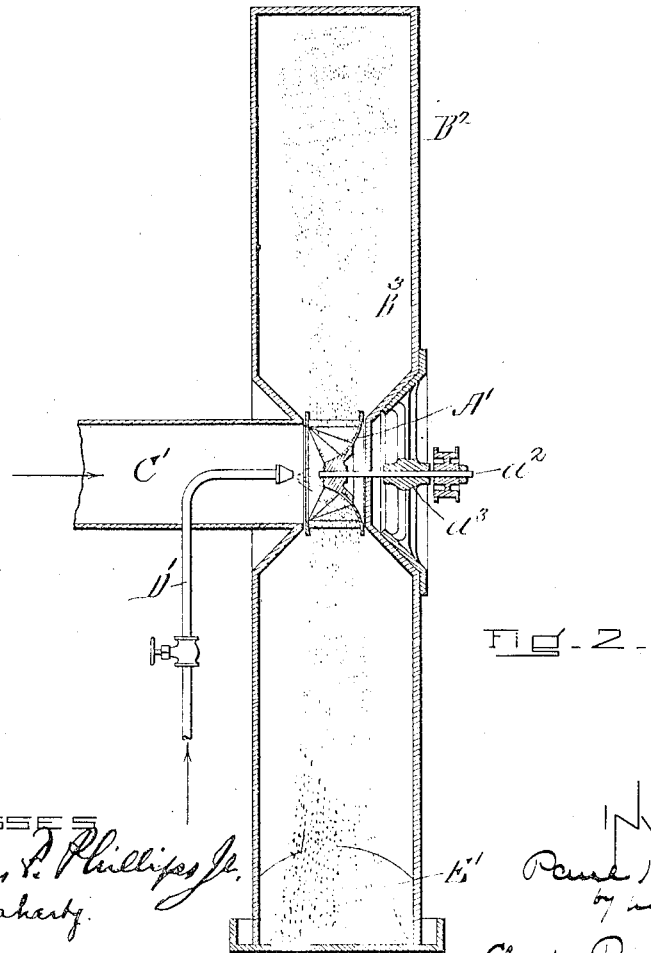

Figure 1 shows the new device in vertical section. Fig. 2 shows in vertical section a modified form of the device to which special reference will hereinafter be made.

Referring to the drawings, A represents the atomizer located within the chamber B having the casing $B^1$ of which $b$ represents the top, $b^1$ the sides and $b^2$ the bottom. The atomizer is so mounted and the chamber is of such dimensions that the atomizer matter thrown from the rapidly rotating atomizer or fan is not thrown against the walls of the chamber, but falls slowly to the bottom thereof. The atomizer is accordingly located centrally within the chamber and preferably at the top thereof as shown in Fig. 1. There the atomizer A is shown mounted upon a rotary shaft $a$ which turns in a bearing $a^1$ attached to the top wall of the chamber. Gas or air is supplied to the atomizer through the pipe C and the fluid to be atomized is supplied by a pipe D having a nozzle $d$ by which the fluid is properly directed into the atomizer. As the atomizer is rotated the atomized matter will be thrown out horizontally to pass alongside the top of the chamber without contacting with it while the side or sides of the chamber are so far removed from the atomizer that the atomized matter will not contact therewith, but fall in a mist toward the bottom of the chamber. There some of the atomized matter is converted into the form of liquid, while the evenly pulverized portion thereof or that intimately mixed with the gas will ultimately escape through the outlet E extending from the bottom of the chamber. This outlet is preferably from the central portion of the chamber in order that the mist may remain in contact with the gas or air a maximum period of time. The liquid in the bottom of the chamber may escape through apertures $b^3$ into a gutter $b^4$ formed by extending the bottom of the chamber beyond the sides thereof and forming thereon an edge $b^5$. From this gutter the liquid may escape through one or more pipes $b^6$. It is also to be noted that the liquid in the gutter forms a seal all around the bottom edge of the chamber which while allowing the liquid in the bottom of the chamber to escape prevents the atomized matter from escaping except through the proper outlet.

In Fig. 2 I have shown an alternate construction in which the atomizing fan or machine is located within a chamber formed by a relatively narrow, high casing. $B^2$ represents this casing. $B^3$ is the interior chamber and $A^1$ the atomizing machine or fan. The fan is located at about the center of the chamber and is carried by a horizontal, rotary shaft $a^2$ turning in a bearing $a^3$ fixed to the side of the casing. $C^1$ represents the gas or air inlet pipe and $D^1$ the pipe through which the fluid to be atomized is supplied to the atomizer. By reason of the fan turning upon a horizontal axis the atomized matter will be thrown from the atomizer in the direction of the top, sides and bottom of the casing. By making the casing of sufficient dimensions the atomized matter will drop to the bottom of the casing before contacting with the top or sides thereof and escape through an outlet $E^1$ at the bottom. Although the greater portion of the atomized liquid will remain in the gas or air inside the casing for a considerable period of time, the defect pertaining to this form or arrangement of my improved apparatus is that the liquid atomized and which is thrown in a downward direction by the atomizer remains in contact with the gas or air for a less period of time than that thrown upwardly and outwardly, but when this form of apparatus is used for humidifying air the defect is of no account. As a matter of convenience, however, the construction is generally preferable to that shown in Fig. 1 as it requires less floor space and mechanically it is better to support the atomizer upon a horizontal rotary shaft than to suspend it vertically.

The outlet for the air may be at any desired part of the chamber, but when the apparatus is used for humidifying air such outlet is preferably made at or near the bottom as shown, as a maximum amount of mist will thereby be carried away with the air. Of course the proper shape and dimensions of the interior of the casing will depend to a considerable degree upon the speed at which the atomizer is to be rotated as well as upon the specific gravity and viscosity of the liquid to be atomized.

Having thus fully described my invention, I claim and desire to secure by Letters Patent of the United States:—

1. In a device of the character specified, the combination of a rotary atomizer, a gas inlet pipe, a pipe for directing fluid to be atomized to the atomizer, a casing inside of which said atomizer is located and which in those parts towards which the atomized liquid is thrown forms a chamber of such size internally that the atomized liquid will not contact therewith but gravitate to the bottom of the casing, and an outlet pipe leading from said casing.

2. In a device of the character specified, the combination of a rotary atomizer, a gas inlet pipe, a pipe for directing fluid to be atomized to the atomizer, a casing within the chamber of which said atomizer is located, means for locating said atomizer in the top of said chamber whereby when the atomizer is rotated the atomized fluid may be thrown from said atomizer alongside and beneath the top of said casing towards the side thereof and which side is so far removed from said atomizer that the atomized fluid will not contact therewith but fall to the bottom of the chamber formed by the casing, and an outlet pipe leading from said casing.

3. Apparatus for intimately mixing a liquid in a finely divided state with air or gas, consisting in combination of a centrifugal fan, an air or gas inlet pipe opening into the eye of said fan, a liquid injecting nozzle projecting into said eye, a casing in which said fan or drum is mounted and which at those parts where the atomized liquid is thrown off from the fan or drum is of such a size internally that the liquid will not be thrown against the walls but will be permitted to fall slowly to the bottom of said casing, and air and gas outlet pipes leading from the said casing, all substantially as set forth.

In testimony whereof I have signed my name to this specification in the presence of two subscribing witnesses.

PAUL KESTNER.

Witnesses:
 CHARRIER, HENRI,
 LÉON PECKEL.